United States Patent
Lindsly et al.

(10) Patent No.: US 7,967,003 B2
(45) Date of Patent: Jun. 28, 2011

(54) WINDSCREEN FOR BACKPACKING STOVES

(76) Inventors: Rand Lindsly, Yosemite National Park, CA (US); Russ Zandbergen, San Jose, CA (US); Lee Zandbergen, Modesto, CA (US)

( * ) Notice: Subject to any disclaimer, the term of this patent is extended or adjusted under 35 U.S.C. 154(b) by 144 days.

(21) Appl. No.: 11/448,181

(22) Filed: Jun. 7, 2006

(65) Prior Publication Data

US 2007/0039603 A1  Feb. 22, 2007

Related U.S. Application Data

(60) Provisional application No. 60/709,632, filed on Aug. 19, 2005.

(51) Int. Cl.
*F24B 3/00* (2006.01)

(52) U.S. Cl. ............. 126/29; 126/25 R; 126/26; 126/43; 126/44; 126/9 R; 292/251.5

(58) Field of Classification Search .................. 126/9 R, 126/43, 44; 292/251.5
See application file for complete search history.

(56) References Cited

U.S. PATENT DOCUMENTS

| | | | |
|---|---|---|---|
| 26,595 A | 12/1859 | Danner | |
| 885,356 A * | 4/1908 | Miller | 126/29 |
| 915,239 A * | 3/1909 | Stapp | 126/59.5 |
| 936,482 A * | 10/1909 | Seeley | 126/43 |
| 1,194,131 A * | 8/1916 | Brown | 126/29 |
| 1,221,514 A * | 4/1917 | Crain | 126/29 |
| 1,298,762 A * | 4/1919 | Milligan | 126/25 R |
| 1,353,265 A * | 9/1920 | Oshige | 126/215 |
| 1,437,073 A * | 11/1922 | Popper | 126/43 |
| 1,437,739 A * | 12/1922 | Vernon | 126/29 |
| 1,508,334 A | 1/1924 | Ingalls | |
| 1,592,729 A * | 7/1926 | Feist | 126/214 D |
| 2,011,752 A * | 8/1935 | Christman | 220/769 |
| 2,014,931 A * | 9/1935 | Genovar, Jr. | 126/390.1 |
| 2,154,305 A | 3/1936 | Goerl | |
| 2,080,592 A * | 5/1937 | Zickler | 126/376.1 |
| 2,174,824 A | 2/1939 | Frank | |
| 2,488,014 A * | 11/1949 | Higman | 126/59 |
| 2,541,265 A * | 2/1951 | McGregor | 126/215 |
| 2,573,211 A * | 10/1951 | Manzler | 126/25 R |
| 2,797,298 A * | 6/1957 | Fujitani | 219/443.1 |
| 2,842,116 A * | 7/1958 | Hinderer | 126/9 A |

(Continued)

FOREIGN PATENT DOCUMENTS

WO    WO 9921465 A1 *  5/1999

*Primary Examiner* — Kenneth B Rinehart
*Assistant Examiner* — Jorge Pereiro
(74) *Attorney, Agent, or Firm* — Robert L. Shaver; Dykas & Shaver, LLP

(57) ABSTRACT

A windscreen configured for use with a backpacking type of stove and a cooking container. The windscreen more effectively and efficiently directs the heat from the stove to the sides of the container so as to utilize less fuel to warm the materials therein, thereby reducing the weight to be carried by the user. In one embodiment, a plurality of adjustable lower vents selectively partially or fully open to control the wind allowed into the interior area of the windscreen so as to better transfer heat from the stove to the sides of the container. In another embodiment, adjustable support tabs at the upper end of the windscreen allow the user to adjust air flow out of the windscreen. In yet another embodiment, the upper end of the windscreen engages the sides or lip of the cooking container and air flows from the interior area through upper vent holes.

15 Claims, 11 Drawing Sheets

U.S. PATENT DOCUMENTS

| | | | |
|---|---|---|---|
| 3,123,062 A * | 3/1964 | Psarris | 126/25 B |
| 3,146,773 A * | 9/1964 | Melzer | 126/9 R |
| 3,151,621 A * | 10/1964 | Jackson | 135/16 |
| 3,331,365 A * | 7/1967 | Sussan | 126/25 R |
| 3,336,847 A * | 8/1967 | Durat | 493/27 |
| 3,391,687 A * | 7/1968 | Hutner, Jr. et al. | 126/215 |
| 3,658,049 A * | 4/1972 | Gerber | 126/215 |
| 3,960,134 A * | 6/1976 | Scott | 126/24 |
| 3,982,524 A * | 9/1976 | Diggs | 126/59.5 |
| 4,604,986 A * | 8/1986 | Barnes | 126/25 B |
| 4,722,322 A * | 2/1988 | Varney et al. | 126/261 |
| 4,875,462 A * | 10/1989 | Armstrong et al. | 126/29 |
| 4,905,659 A * | 3/1990 | Armistead | 126/9 R |
| 4,909,235 A * | 3/1990 | Boetcker | 126/9 R |
| 5,002,037 A * | 3/1991 | Armstrong et al. | 126/29 |
| 5,074,279 A * | 12/1991 | Sainsbury | 126/25 B |
| 5,203,316 A * | 4/1993 | Pritchett | 126/29 |
| 5,373,863 A * | 12/1994 | Prizio | 135/97 |
| 5,404,864 A * | 4/1995 | Kent, Jr. | 126/9 B |
| 5,471,783 A * | 12/1995 | McLean | 47/30 |
| 5,682,872 A * | 11/1997 | Whitted | 126/29 |
| 5,915,371 A * | 6/1999 | Hering | 126/9 R |
| 5,979,428 A * | 11/1999 | Greene, Jr. | 126/38 |
| 7,107,983 B1 * | 9/2006 | West | 126/25 R |
| 7,246,614 B2 | 7/2007 | Huggins | |
| 7,600,510 B2 | 10/2009 | Huggins | |
| 7,694,671 B2 * | 4/2010 | Lee | 126/214 D |
| 2003/0230298 A1 * | 12/2003 | Klarich et al. | 126/9 R |
| 2004/0128880 A1 * | 7/2004 | Abe | 40/514 |
| 2004/0238089 A1 * | 12/2004 | Li et al. | 150/166 |
| 2005/0217657 A1 * | 10/2005 | Anue | 126/9 R |
| 2005/0274372 A1 * | 12/2005 | Knight | 126/9 R |

* cited by examiner

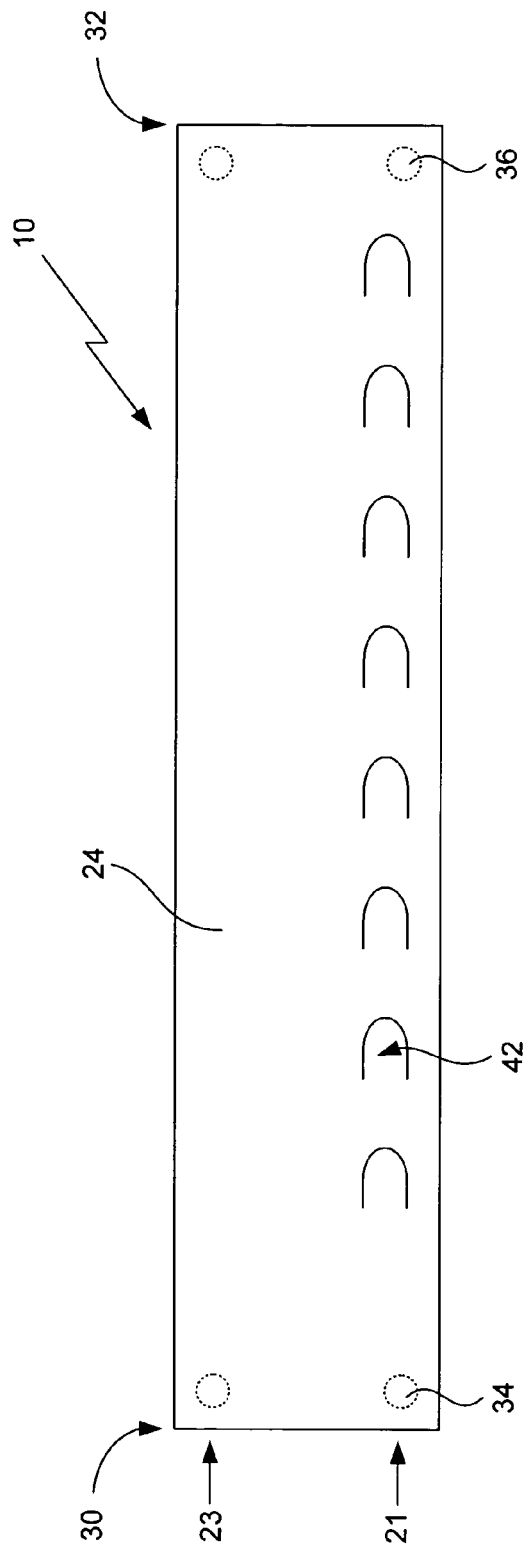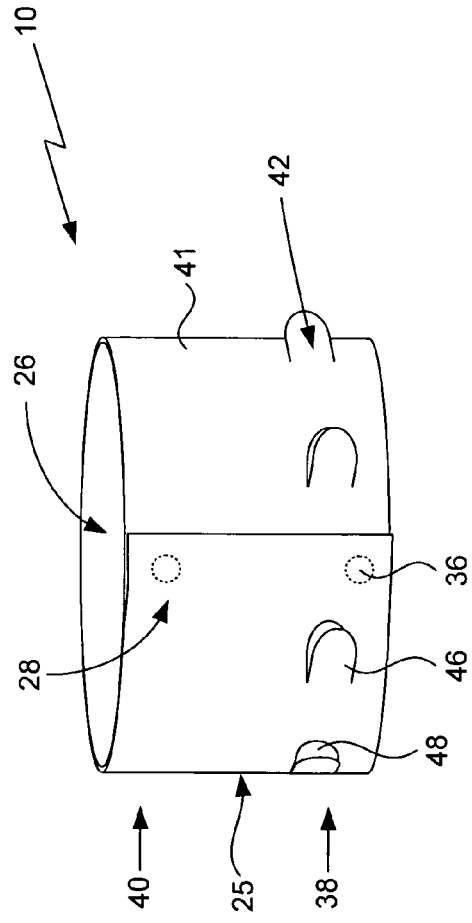

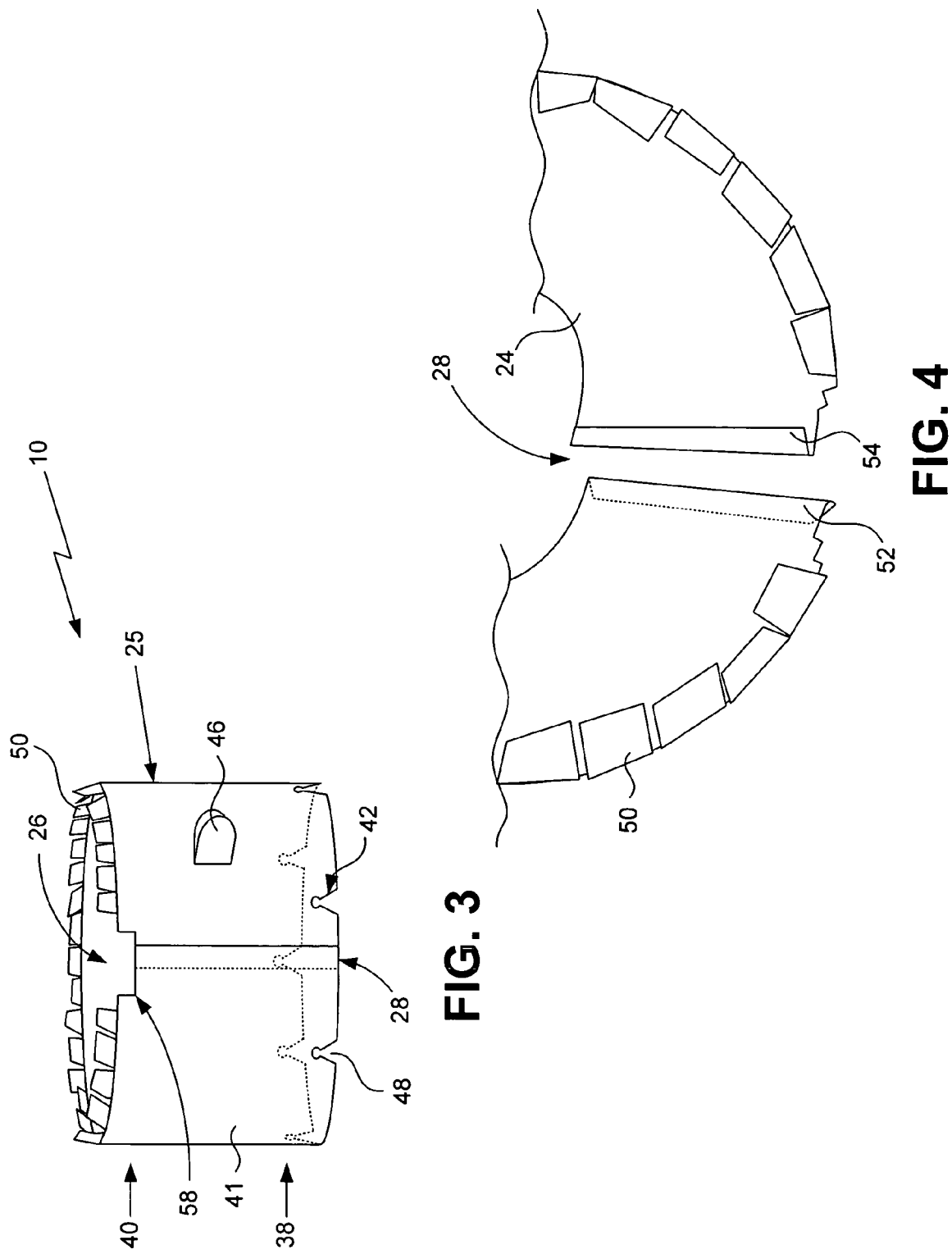

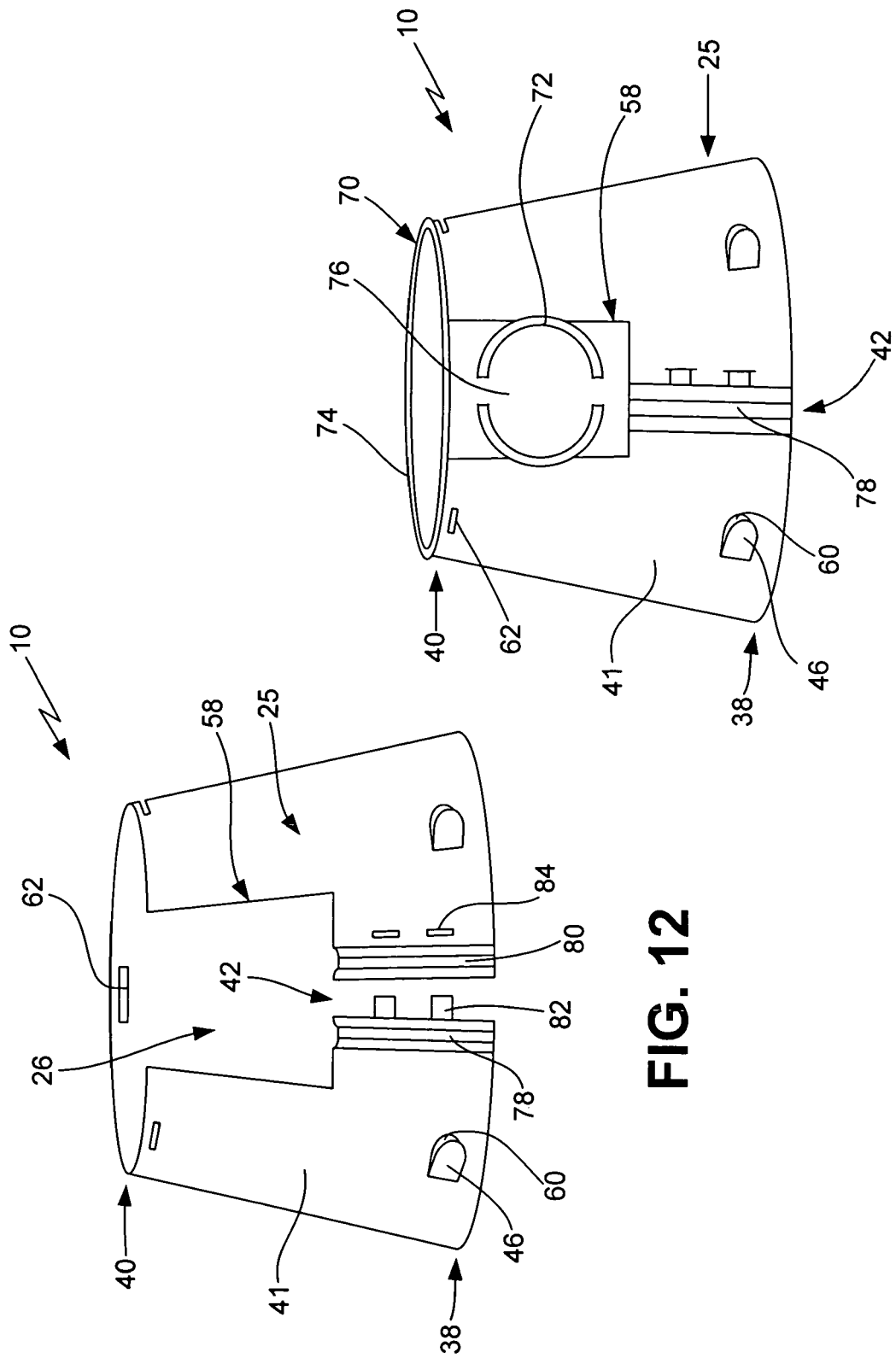

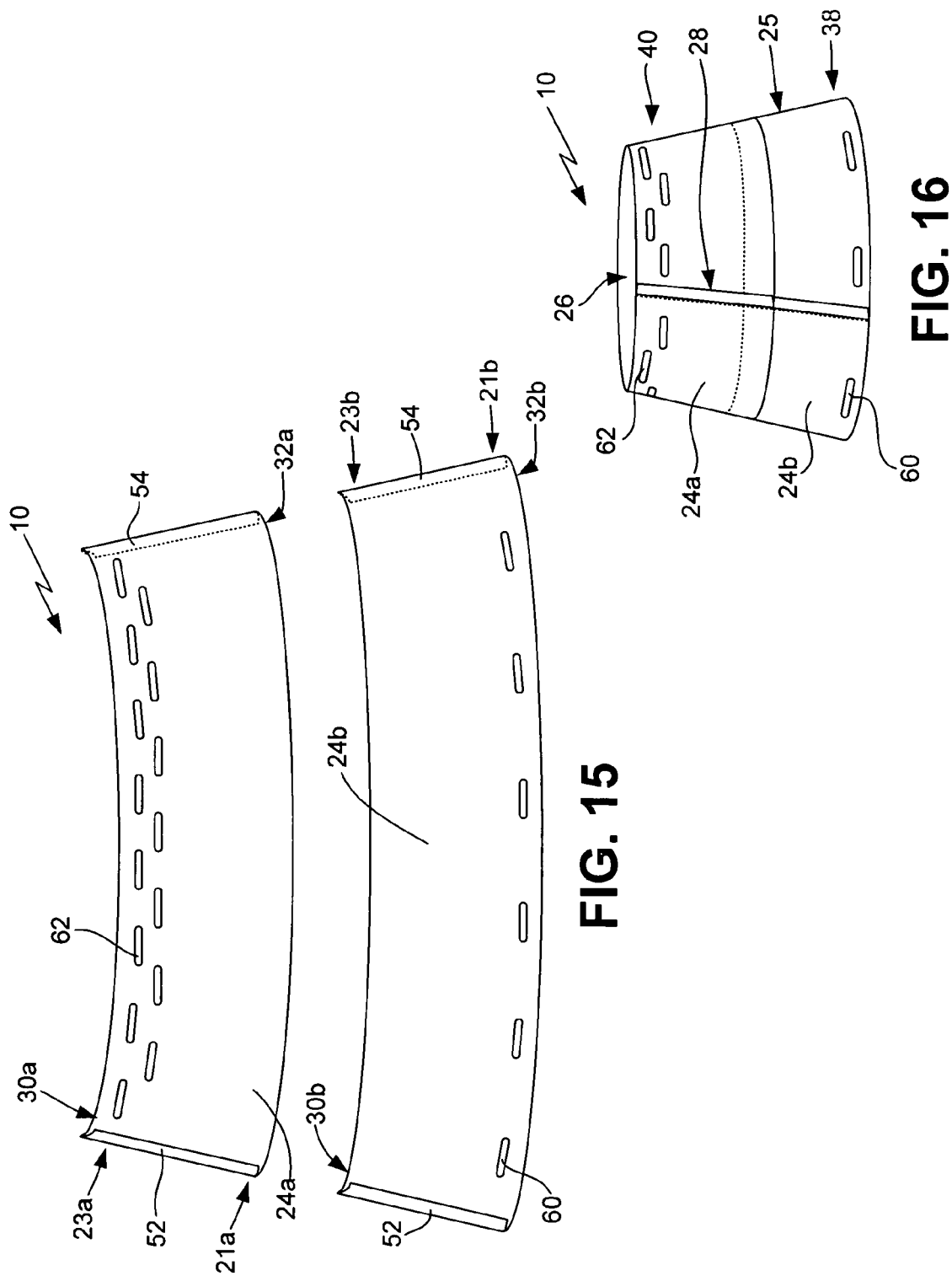

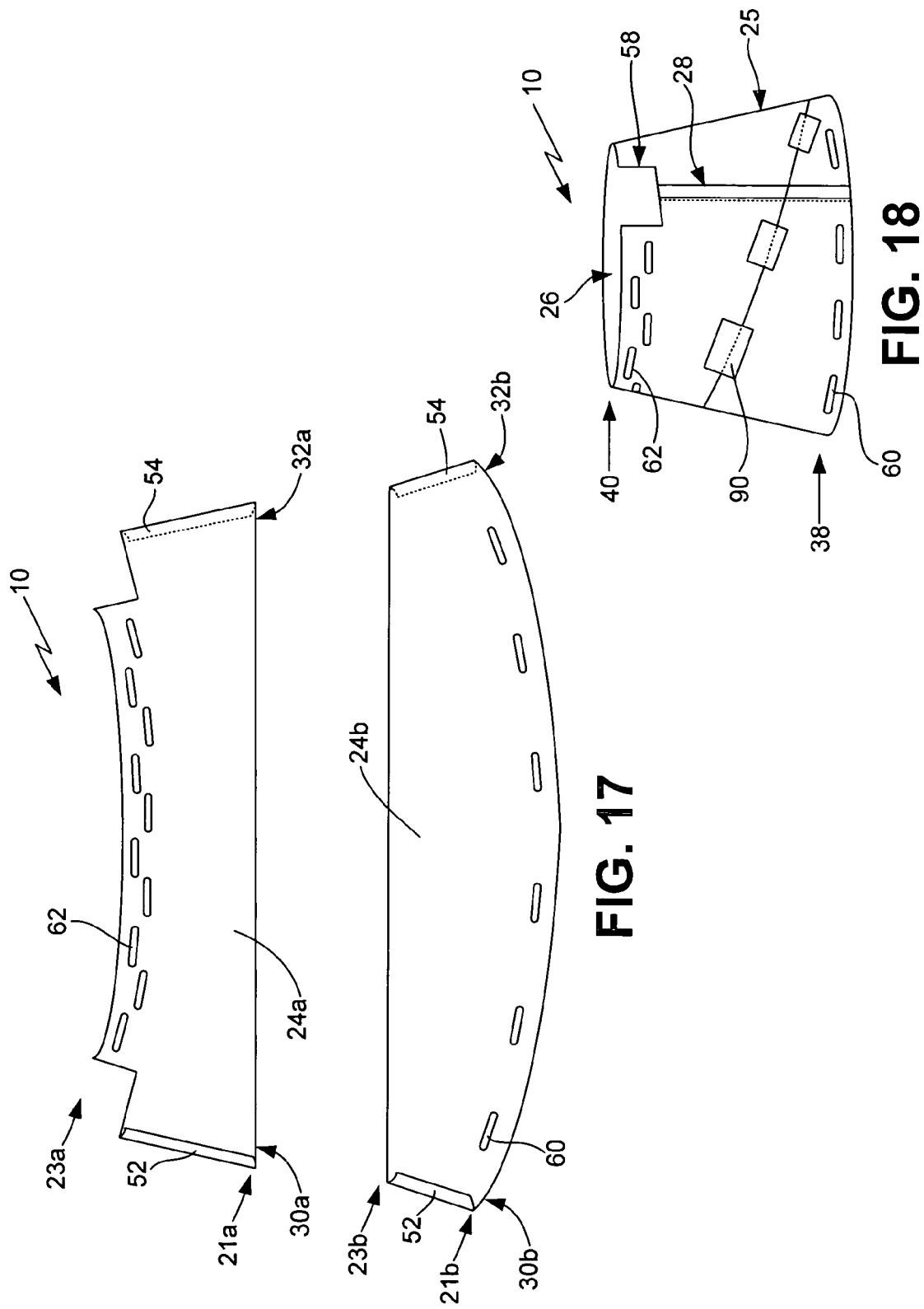

WINDSCREEN FOR BACKPACKING STOVES

CROSS-REFERENCE TO RELATED APPLICATIONS

This application claims the benefit of U.S. Provisional Application No. 60/709,632 filed on Aug. 19, 2005.

BACKGROUND OF THE INVENTION

A. Field of the Invention

The field of the present invention relates generally to apparatuses utilized for backpacking, hiking, camping and similar outdoor activities. In particular, the present invention relates to such apparatuses that are used in conjunction with cooking systems comprising backpacking stoves, pots and like equipment for heating food and liquids while engaging in such outdoor activities. Even more particularly, this invention relates to windscreens that are used to improve the use and efficiency of such cooking systems by improving the heat transfer from the stove to the cooking pot.

B. Background

Backpacking, hiking and camping are some of the most popular forms of outdoor activities engaged in by people throughout the world. In addition to the known health benefits that derive from the exercise resulting from engaging in these activities, those who backpack, hike and camp also get to enjoy the often spectacular views, cleaner air, exposure to animals and birds and the excitement resulting from exploring new areas. With regard to backpacking and hiking, as opposed to camping with a vehicle, the supplies the backpacker or hiker needs to enjoy his or her outdoor activity are generally carried in a pack on the person's back. Backpacking, which generally differs from hiking in that the participant will hike for multiple days requiring one or more nights in the outdoors, requires the backpacker to carry tents, sleeping bags, clothes, food and cooking gear. Those who have been backpacking overnight know that the weight of the gear required to backpack for multiple days can be somewhat significant. In fact, the amount of gear necessary for even a two to three day backpack trip can, depending on the weather and amount and type of climate-specific gear needed, result in a backpack that weights thirty, forty or even fifty pounds or more. Even day hiking, which does not require the sleeping bag, tent and related gear, can still result in packs that weigh twenty pounds or more. Unless pack animals are utilized, all this weight must be carried in a pack on the participant's back. Over the years, there has been an increasingly popular movement to reduce the weight of the gear necessary to comfortably enjoy oneself in the outdoors so as to reduce the weight of the backpack and, therefore, heighten the enjoyment level of the backpacker by reducing the strain on his or her body. In addition, with a lower weight pack the backpacker or hiker can generally travel further than he or she would be able to with a "full" weight pack.

One of the contributing factors to the weight of the pack is the need to carry equipment to cook food and heat liquids, including in some cases to boil water so as to make it suitable for drinking. Typically, such equipment includes a backpacking stove, fuel for the stove and a cooking pot. Although there is a wide variety of backpacking stoves that utilize a variety of fuel sources, perhaps the most common types are those that use hydrocarbon fuels, typically white gas, kerosene, butane, propane, unleaded gas or the like. This fuel is carried in containers suitable for safely storing the fuel and which connect to the stove to deliver the fuel to the stove's burners. Most of these stoves comprise a regulator system that controls the amount of fuel and, therefore, the heat emitted by the stove. In addition to carrying the stove, the person must also carry enough fuel to last the planned length of the trip and a suitably sized container to carry that fuel. As an alternative to hydrocarbon-based stoves, some people utilize wood burning stoves or solid fuel stoves. While the wood burning stoves eliminate the need to carry the fuel and fuel container, they are only suitable for use where there is known to be a reliable source of appropriate fuel (i.e., not in areas where there is much snow or rain).

One of the well known problems with currently available cooking systems is the efficiency of the transfer of heat from the backpacking stove to the cooking pot, which historically is known to be relatively inefficient. Because of the inefficiency of presently available cooking systems, the backpacker or hiker must carry more fuel and a larger container in which to carry that fuel. Much of the inefficiency of presently configured backpacking cooking systems is a result of the way in which the heat from the stove contacts the cooking pot. Generally, the pot sits on top of cage or cage-like support above the stove and the flame from the stove is directed at the bottom center of the pot. Ideally, the flame spreads across the bottom of the pot and at least partially up the sides of the pot so as to better distribute the heat to the food or liquid in the pot. Unfortunately, wind and other issues can substantially reduce this effect, resulting in much of the heat being not evenly directed to the pot and, in extreme cases even away from the pot altogether. In addition, wind blowing across the stove can result in the heat source being extinguished, thereby requiring the user to re-light the stove and losing efficiency from the loss of the heat.

To reduce the effect of wind on the heat transfer from the stove to the pot, most backpacking stove users utilize a windscreen to block the wind from blowing across the stove/pot area. While a windscreen can be as simple as a person's body, large rock or other obstruction on the upwind side of the stove/pot area, most backpacking stove windscreens comprise a piece of metal that is placed generally around the stove and pot in an upstanding fashion to block the wind from blowing the heat away from the pot and, therefore, requiring more fuel to obtain the desired cooking of the food or heating of the liquid in the pot. The typical windscreen comprises a generally solid, elongated piece of aluminum or other lightweight metal that is shaped or bent to go around the stove in an effort to prevent the wind from blowing across the stove, directing the heat away from the pot and extinguishing the heat source.

One of the problems with the presently available windscreens is that, because they are solid, they can block all of the wind from the stove. As those familiar with such stoves will be readily aware, the stove does require a certain amount of air in order to supply the oxygen necessary for burning the fuel. To compensate for the problem of blocking all of the wind/air, present windscreens are generally configured to encircle the stove with a sufficient amount of space between the stove and windscreen to allow air to pass over the windscreen and be received by the stove. Unfortunately, this space between the stove and windscreen also allows the heat to escape from the stove without efficiently heating the cooking pot. What is needed, therefore, is a windscreen that improves the efficiency of the heat transfer between the stove and the cooking pot. The desired windscreen should be able to more efficiently retain, direct and protect the heat source and, therefore, result in more efficient heating of the food or liquid in the cooking pot. The preferred windscreen should be configured so as to substantially block the wind from blowing across the stove, direct the heat from the stove across the bottom and sides of the pot and allow the user to control the amount of air flowing to the stove so as to optimize the heating effect of a unit of fuel. The preferred windscreen should be lightweight, easy to use and adaptable to a wide variety of different stove and pot cooking systems.

SUMMARY OF THE INVENTION

The windscreen for backpacking stoves of the present invention provides the benefits and solves the problems identified above. That is to say, the present invention discloses an improved windscreen for backpacking stoves and the like that more efficiently retains, directs and protects the heat source to more effectively heat food or fluid in a cooking pot or the like. The windscreen of the present invention substantially blocks the wind from blowing across a backpacking type stove, better directs the heat from the stove or other heat source across the bottom and sides of the cooking pot and allows the user to control the amount of air flowing to the stove so as to optimize the efficiency of the fuel. The windscreen of the present invention is lightweight, easy to use and adaptable to a wide variety of different stove and pot cooking systems. In one preferred embodiment, the windscreen has a plurality of adjustable lower vents near the bottom of the windscreen that the user can selectively partially or fully open to allow some air to get to the stove and better carry the heat from the stove to the sides of the cooking pot. In another embodiment of the present invention, the windscreen has a plurality of open lower vents at the bottom of the windscreen and a plurality of adjustable upper vents at the top of the windscreen that are configured to support a cooking pot thereon and direct the heat inwards to the sides of the cooking pot. In another preferred embodiment, the windscreen is generally cone-shaped and configured to support a cooking pot at the top of the screen with both lower and upper open vent holes for directing air into the stove area and heat up the sides of the cooking pot.

In one general aspect, the windscreen for backpacking stoves of the present invention is configured from a generally elongated main body, having a first end, a second end, first side and a second side, that is made out of relatively lightweight, corrosion resistant materials, such as aluminum and the like. The first and second ends of the main body member are connected together, either releasably or fixedly, to define an upright structure having an interior area, a lower end, an upper end and a side wall disposed therebetween. The stove is received in the interior area and a cooking container, such as a pot, bowl or cup, is received at the upper end of the upright structure. One or more lower venting apertures are disposed in the side wall of the upright structure and positioned generally near or at the lower end thereof. In one embodiment, the lower venting apertures include a mechanism for controlling air flow therethrough, such as a bendable tab that the user can selectively open, close or partially open. In one configuration, the first and second ends of the main body are connected by magnets. In another configuration the ends are connected by being cooperatively shaped so that they engage each other. In yet another configuration, the first end has a first ridge section and one or more insert tabs and the second end has a second ridge section and openings positioned to receive the insert tabs. The first ridge cooperatively engages the second ridge and the insert tabs are placed inside the openings to form the desired upright structure.

In a preferred embodiment, the upper end of the upright structure includes a mechanism for directing the heat from the stove inside the windscreen to the side wall of the cooking container. The directing mechanism can comprise the upper end of the upright structure being shaped and configured to substantially engage either the side wall or a lip of the cooking container to block off the majority of heat from the stove passing directly through the upper end. One more upper venting apertures are provided for the heat discharge. The upright structure can be conically shaped to assist in directing heated air to the sides of the cooking container. For a cylindrically shaped upright structure, the cooking container can have a side wall that angles or slopes inward away from the side wall of the windscreen to improve heat transfer to the side wall of the container. In an alternative embodiment, the directing mechanism can comprise a plurality of support tabs at the upper end of the support structure that are bendably attached to the side wall thereof to allow the user to adjust them inward or outward to selectively direct heated air towards the side wall of the cooking container. The support tabs can engage the side wall of the cooking container or they can be configured to engage the lip of the container and support the container in the windscreen above the stove. By better directing the heat towards the side wall of the container, which is generally not achieved at all in the prior art, the windscreen of the present invention more effectively and efficiently heats the materials in the container, thereby reducing the amount of fuel used for such heating and the amount of fuel which must be carried by the user.

The windscreen of the present invention can be provided with an access opening at the upper end of the upright structure to allow the user to more easily insert and remove the cooking container from the windscreen by using pot tongs, handles or the like. The windscreen can also comprise one or more lateral support apertures that receive a lateral support member that is configured to support the cooking container in the interior area above the stove. In another embodiment, the windscreen is provided with one or more ribs on the side wall that have an offset section that is generally disposed into the interior area so as to engage the side wall or lip of the cooking container.

Accordingly, the primary objective of the present invention is to provide an improved windscreen for use with backpacking stoves and the like that provides the benefits described above and solves the problems associated with presently available backpacking stove windscreens.

It is an important objective of the present invention to provide a windscreen for backpacking stoves that is configured to improve the efficiency of the transfer of heat from the stove to the cooking pot so as to reduce the amount of fuel necessary to heat the food or liquid in the pot to the desired temperature.

It is also an important objective of the present invention to provide a windscreen for backpacking stoves that is configured to cooperate with the cooking pot so as to improve the transfer of the heat from the stove to the sides or side wall of the cooking pot to more efficiently and effectively heat the materials in the cooking pot to the desired temperature.

It is also an important objective of the present invention to provide a windscreen for backpacking stoves that is configured to substantially block the wind from blowing across the backpacking stove and allow the user to control the amount of air that is received by the stove.

It is also an important objective of the present invention to provide a windscreen for backpacking stoves that is lightweight, easy to carry and relatively inexpensive to manufacture.

The above and other objectives of the present invention will become readily apparent and are explained in greater detail by reference to the attached figures and the description of the preferred embodiment which follows. As set forth herein, the present invention resides in the novel features of form, construction, mode of operation and/or combination of processes presently described and understood by the claims.

BRIEF DESCRIPTION OF THE DRAWINGS

In the drawings which illustrate the preferred embodiments and the best modes presently contemplated for carrying out the present invention:

FIG. 1 is a side view of a disassembled windscreen having a plurality of adjustable lower vents configured according to the various principles and concepts of a preferred embodiment of the present invention;

FIG. 2 is a side perspective view of the windscreen of the present invention of FIG. 1 shown assembled and ready for use;

FIG. 3 is an alternative preferred embodiment of a windscreen configured according to the present invention having a plurality of fixed open lower vents, one or more adjustable upper vents and a plurality of adjustable support tabs for supporting a cup, bowl or pot;

FIG. 4 is an isolated top view of the connection area of the windscreen of FIG. 3 showing the connection mechanism;

FIG. 12 is a side perspective view of an alternative preferred embodiment showing a disassembled conical windscreen having vertical ridges and insert tabs for the connecting mechanism;

FIG. 13 is a side perspective view of the windscreen of FIG. 12 shown assembled and in use with a cup or like container;

FIG. 15 is a side view of an alternative embodiment of the present invention showing a disassembled windscreen comprising two separated body sections for more efficient packability;

FIG. 16 is a side perspective view of a windscreen showing the two body sections of FIG. 15 assembled into the windscreen of the present invention by stacking the two body sections together;

FIG. 17 is a side view of an alternative embodiment of the present invention showing a disassembled windscreen comprising two separated body sections for more efficient packability and an access opening;

FIG. 18 is a side perspective view of a windscreen showing the two body sections of FIG. 17 assembled into the windscreen of the present invention with the use of tape.

DETAILED DESCRIPTION OF THE PREFERRED EMBODIMENTS

With reference to the figures where like elements have been given like numerical designations to facilitate the reader's understanding of the present invention, the preferred embodiments of the present invention are set forth below. The enclosed figures and drawings are merely illustrative of a preferred embodiment and represents one of several different ways of configuring the present invention. Although specific components, materials, configurations and uses are illustrated, it should be understood that a number of variations to the components and to the configuration of those components described herein and in the accompanying figures can be made without changing the scope and function of the invention set forth herein. For purposes of simplifying this disclosure, the discussion and references herein are generally to use of the present invention with stoves particularly configured for use while backpacking. Those skilled in the art, however, will understand and appreciate that the windscreen disclosed herein is not so limited, namely that it can be used with a wide variety of different types of backpacking or backpacking-type stoves.

Figure 6:
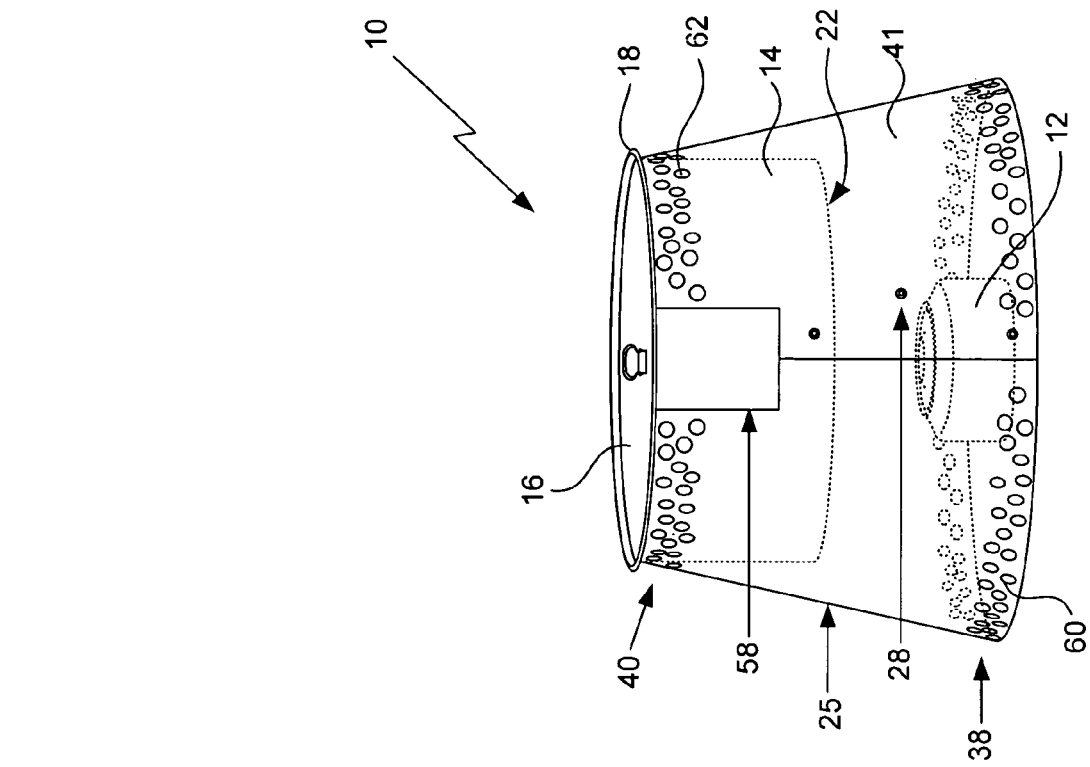
FIG. 6 a side perspective view of the windscreen of FIG. 5 shown in use with a cooking pot and stove.
Figure 7:
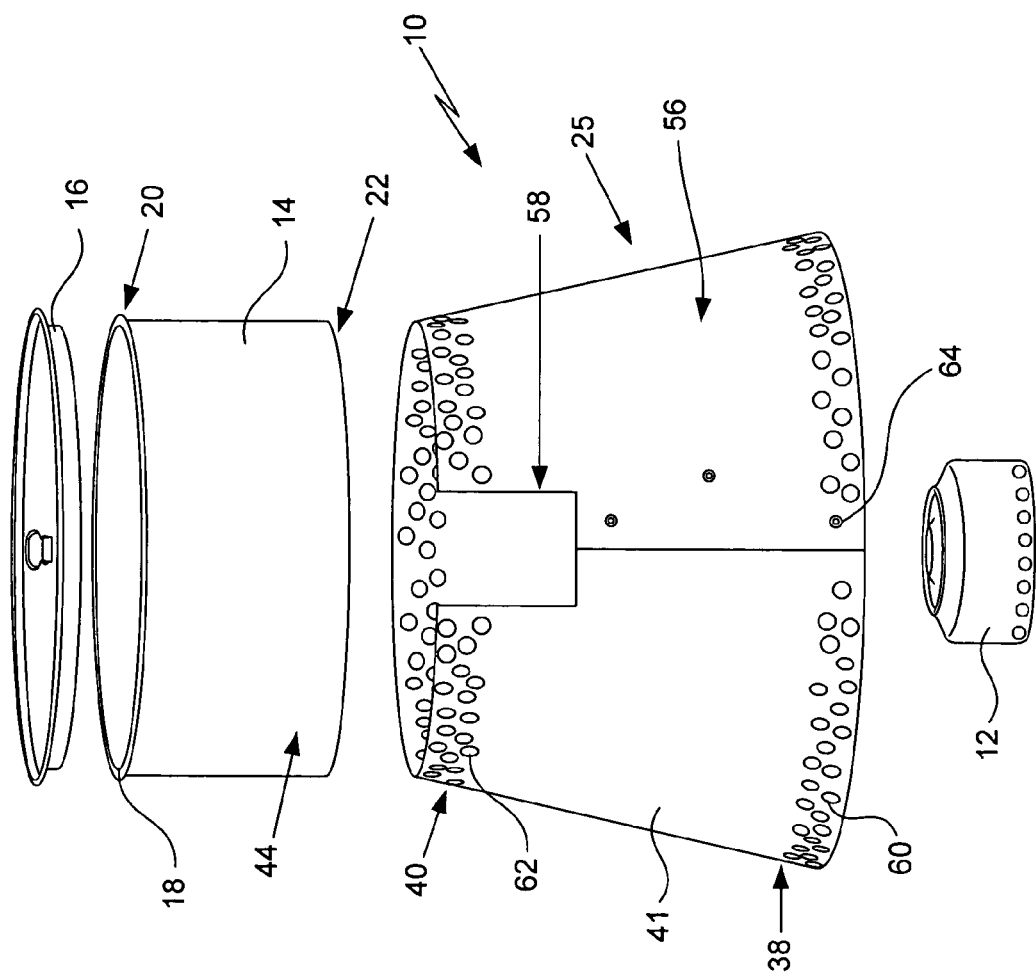
FIG. 7 is an exploded side perspective view of the windscreen, pot and stove of FIG. 6.

A windscreen that is manufactured out of the components and configured pursuant to a preferred embodiment of the present invention is shown generally as 10 in the figures. As best shown in FIGS. 6 and 7, windscreen 10 is configured for use with a backpacking type of stove 12 to heat food or liquid, typically water used for drinking or food preparation, in a cooking container such as cooking pot 14 having a lid 16. FIG. 6 shows the stove 12 and cooking pot 14 in use for one embodiment of windscreen 10, with cooking pot 14 supported by its generally outwardly protruding lip 18 located at the upper edge 20 thereof. As known in the prior art, heat from stove 12 or other heat source is directed towards the bottom 22 of cooking pot 14 to heat the food or liquid therein. Although the embodiments shown in FIGS. 6 and 7, show use of windscreen 10 with a typical cooking pot 14 as the container, the invention is not so limited. As set forth below, windscreen 10 can be configured to be utilized with a variety of different containers suitable for cooking food or heating liquids therein. In addition, use of windscreen 10 of the present invention is not limited to a particular configuration or type of stove 12, as windscreen 10 is suitable for use with wood burning as well as fuel-types of stoves 12, particularly of the type that are generally utilized in backpacking and, more particularly, by those who strive to carry the lightest weight possible while backpacking or hiking.

In the embodiment of the present invention shown in FIGS. 1 and 2, windscreen 10 generally comprises a main body 24 having a first side 21 and a second side 23. Preferably, windscreen 10 is made from a generally rectangular piece of lightweight material, such as aluminum or sheet metal, that is adaptable to being formed into upright structure 25 which has a generally cylindrical or conical shape defining an interior area 26 (as shown in FIG. 2) around stove 12 and at least the lower portion of pot 14 so as to block the wind from blowing across stove 12. Windscreen 10 also comprises a connecting mechanism, shown generally as 28, to connect the first end 30 and second end 32 of main body 24 together to securely, but disconnectedly, form the cylindrically shaped upright structure 25, having a lower end 38 that rests on the ground or other appropriate surface and an open upper end 40, defining interior area 26. In the figures, first side 21 defines lower end 38 and second side 23 defines upper end 40 with a side wall 41 disposed therebetween. The connecting mechanism 28 of this embodiment comprises one or more first magnets 34 generally at or near first end 30 and one or more second magnets 36 generally at or near second end 32 that are configured to engage each other and secure main body 24 in the upright structure 25 when windscreen 10 is in use. In the preferred embodiment of this configuration, as shown, connecting mechanism 28 comprises a pair of first magnets 34, one located generally near lower side 38 and one located generally near upper side 40, and a pair of correspondingly located second magnets 36. Depending on the strength of the magnets 34 and 36 utilized for connecting mechanism 28 and the material utilized for main body 24 (i.e., how well the magnets attach thereto or, for non-ferrite metals, if at all), it may be possible to utilize only first 34 or second 36 magnets to obtain the desired joining of first end 30 and second end 32 to define upright structure 25 and interior area 26. Instead of magnets 34 and 36, windscreen 10 can be provided with other types of releasable connecting mechanism 28 that allow the user to secure the main body 24 in the desired shape for upright structure 25, typically cylindrical or conical, such as Velcro®, snaps, pin/socket and like connectors that provide a relatively easy to secure and release connection.

To accomplish the objectives of the present invention, windscreen 10 further comprises a venting mechanism 42 configured to allow some air through upright structure 25 to stove 12. With venting mechanism 42, windscreen 10 can be placed very near stove 12 so as to better retain the heat from stove 12, better direct the heat to and along the bottom 22 and side wall 44 of pot 14 and better protect the heat source of stove 12 from being extinguished by the wind. In the embodiment of FIGS. 1 and 2, venting mechanism 42 comprises a means for controlling the air flow into interior area 26, which in this embodiment is a plurality of individually operated vent tabs 46 near the lower end 38 of upright structure 25 that are configured to be selectively opened, whether fully or partially, to expose the vent aperture 48 associated with each vent tab 46. As may be desired by the user of windscreen 10, each individual vent tab 46 can be either left completely shut, partially opened to let in a desired amount of air or opened completely to let in the maximum amount of air that can pass through vent aperture 48. In this manner, the user can close, partially or fully, the vent tabs 46 facing the wind direction, open the rearward facing vent tabs 46 and partially open the vent tabs 46 at an angle to the wind source or a variety of other possible combinations of opening/closing of vent tabs 46. Alternatively, the control mechanism can be slidable tabs, ring sections or one or more sliding members that are selectively slid to open or close vent apertures 48 as desired. In the embodiment shown, the vent tabs 46 of the control mechanism are formed from or cut out of main body 24 such that the user only has to bend vent tabs 46 to open or close vent aperture 48 to allow or prevent air flowing to stove 12.

In use with a stove 12 that is configured to support cooking pot 14 thereon, stove 12 is placed on the ground or other support surface, cooking pot 14 is placed on top of stove 12, upright structure 25 is placed into its generally cylindrical (or conical) shape around stove 12 and pot 14, with the bottom of the lower end 38 placed on the support surface, by connecting first 34 and second 36 magnets to form interior area 26 occupied by stove 12 and pot 14. Either before or after stove 12 is lit, the user selectively opens selected vent tabs 46 and closes other vent tabs 46 to allow air to flow through vent apertures 48 into interior area 26 so as to direct the heat from stove 12 up the side wall 44 of pot 14 to more uniformly and quickly heat the food or liquid inside pot 14. The geometry and configuration of windscreen 10 is selected, relative to pot 14, to restrict the escape of heat from the top of interior area 26 so as to direct the heat around the side wall 44 of pot 14 to better heat the side wall 44 in addition to the bottom 22 of pot 14. As will be readily apparent to those skilled in the art, this will more effectively and efficiently heat the food or liquid in pot 14, thereby requiring use of less fuel and the need to carry as much fuel while backpacking or hiking.

In the embodiment shown in FIGS. 3 and 4, venting mechanism 42 of windscreen 10 comprises a plurality of fixedly open vent apertures 48 along or near the lower end 38 of upright structure 25 that are configured to allow air to flow into interior area 26 formed around stove 12 and at least the lower end of pot 14. Venting mechanism 42 also includes a plurality of individually foldable support tabs 50 at upper end 40 that are configured to allow the user to selectively fold support tabs 50 inwards or outwards relative to interior area 26 so as to allow air to controllably flow out interior area 26 and be able to support cooking pot 14 at its lip 18. With a sufficient amount of support tabs 50 folded inward, support tabs 50 will safely support the weight of pot 14 and direct the heat from stove 12 inwards so as to better heat the side wall 44 of pot 14 and more quickly and efficiently heat the food and liquid in pot 14. In the preferred embodiment, support tabs 50 are formed from or cut out of the material used for main body 24 and are made to be sufficiently stiff so as to support the weight of pot 14 with food or liquid therein. In the embodiment shown in FIGS. 3 and 4, the connecting mechanism 28 comprises a first folded lip 52 and a second folded lip 54 that are cooperatively configured so as to engage each other and hold main body 24 in the desired generally cylindrical shape to form upright structure 25 and interior area 26 for placement of stove 12 and pot 14 inside windscreen 10. As will be readily apparent to those skilled in the art, other similarly configured first 30 and second 32 end-engaging types of connecting mechanisms 28 will also be suitable for windscreen 10. Although this embodiment is shown with fixed open vent apertures 48 at lower end 38, those skilled in the art will readily understand that this embodiment can be configured with the individually openable vent tabs 46 shown in FIGS. 1 and 2 to provide the user with control of the air flow at the bottom and top of windscreen 10. In addition, one or more vent tabs 46 with vent apertures 48 can be located along the side wall 41 of upright structure 25. The embodiment of FIG. 3 also has access opening 58 to facilitate the user being able to grasp pot 14 with pot gripping tools (not shown) or to allow a handle (also not shown) associated with pot 14 (which, as known in the art, can be configured more as a cup than a traditional pot) to extend outward of windscreen 10 so that windscreen 10 can be positioned closely to the side wall 44 of pot 14 and the user can easily remove pot 14 from windscreen 10. If pot 14 is a traditionally configured pot with lip 18, access opening 58 only needs to be cut down enough to allow the user to grasp lip 18 with the pot grippers typically used with backpacking stoves. If pot 14 has a handle, such as if it is a cup, then access opening 58 will need to be cut down further to allow the handle to extend outwardly of windscreen 10.

Figure 5:
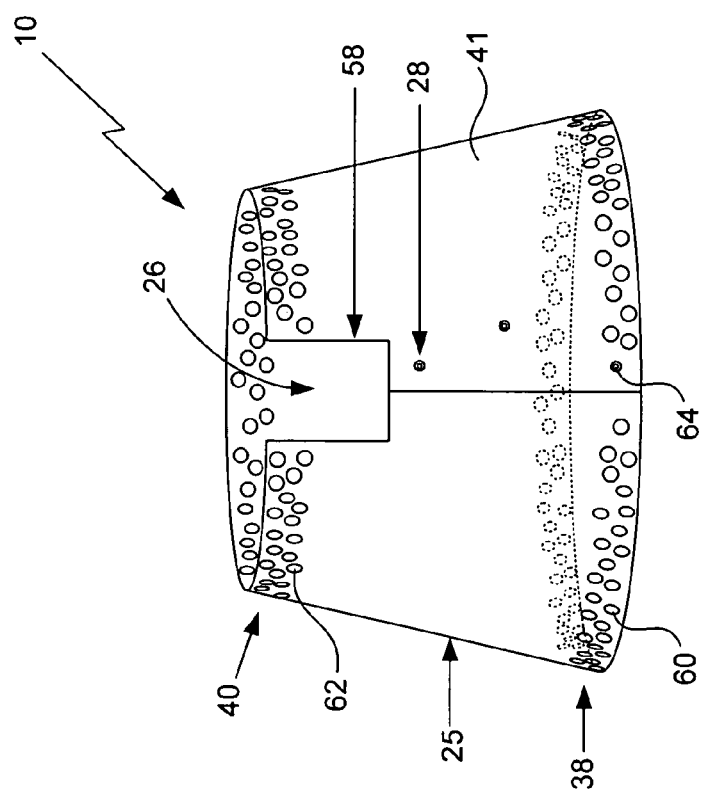
FIG. 5 is a side perspective view of another alternative preferred embodiment showing the windscreen formed in a generally conical shape with both lower and upper open vents configured as fixed open holes.

In the embodiment shown in FIGS. 5 through 7, windscreen 10 has main body 24 configured such that when it is formed into upright structure 25 with interior area 26 it is generally conically shaped, with the upper end 40 thereof narrower than the lower end 38. The conical shape of this embodiment directs the heat from stove 12 inward to the substantially vertical side wall 44 of pot 14, much like the support tabs 50 above when they are folded inward. In the present embodiment, side wall 41 of upright structure 25 is configured to safely support pot 14 at its lip 18, with access opening 58 cut into main body 24 so as to allow pot grippers to be used and/or a handle to extend outwardly of windscreen 10. The venting mechanism 42 of this embodiment comprises a plurality of lower venting apertures 60 (which are the same as vent apertures 48) placed generally towards lower end 38 and a plurality of upper venting apertures 62 placed generally towards upper end 40 of windscreen 10. In the embodiment shown, the lower 60 and upper 62 venting apertures are fixedly open. In an alternative configuration, not shown, lower 60 and/or upper 62 venting apertures can be configured with the vent tabs described and shown with regard to FIGS. 1 and 2, with a selectively openable vent tab 46 to allow the user to have more control over the air flow past windscreen 10, or upper end 40 could have the support tabs 50 shown in FIGS. 3 and 4. In either configuration, the majority of the wind is blocked by windscreen 10 and a relatively small amount of wind is allowed into interior area 26 to supply air to stove 12. The conical configuration of windscreen 10 will direct the heat that rises from stove 12 inward to the side wall 44 of pot 14 to better heat the food or liquid inside and to more efficiently utilize the fuel used by stove 12. Connecting mechanism 28 shown in FIGS. 5 through 7 comprises one or more rivet or rivet-like connectors 64 that fixedly attach first end 30 to second end 32 of main body 24 to form the desired conically shaped interior area 26. Other types of fixed connecting mechanisms 28, including welding, adhesives, soldering and the like, will also be suitable for use with windscreen 10.

Figure 9:
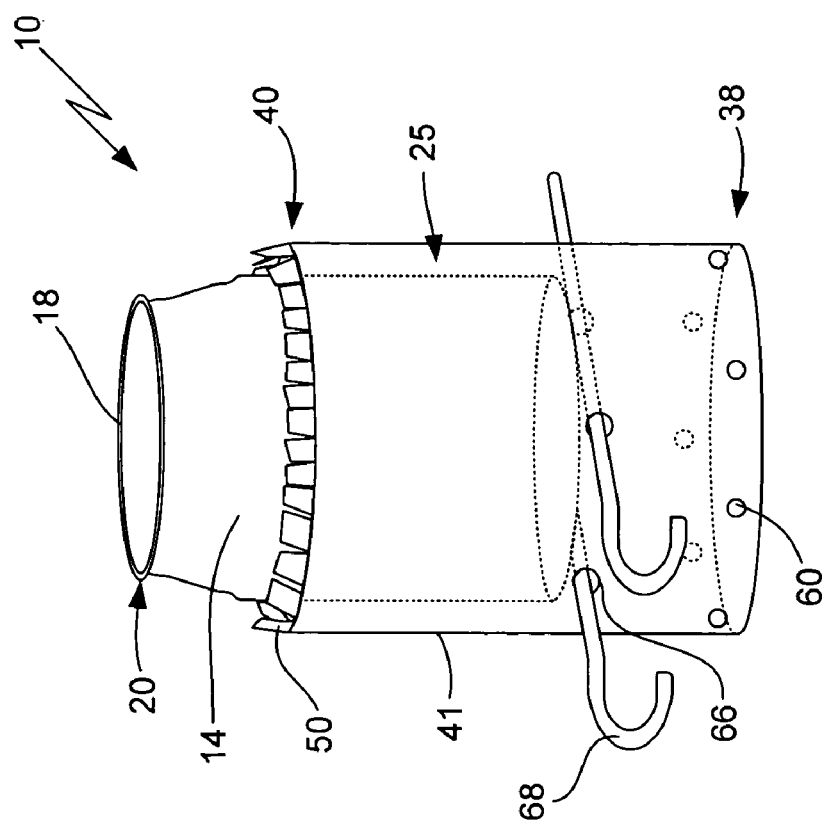
FIG. 9 is a side perspective view of the windscreen of FIG. 8 shown in use with a cooking container supported by a pair of lateral support members.
Figure 8:
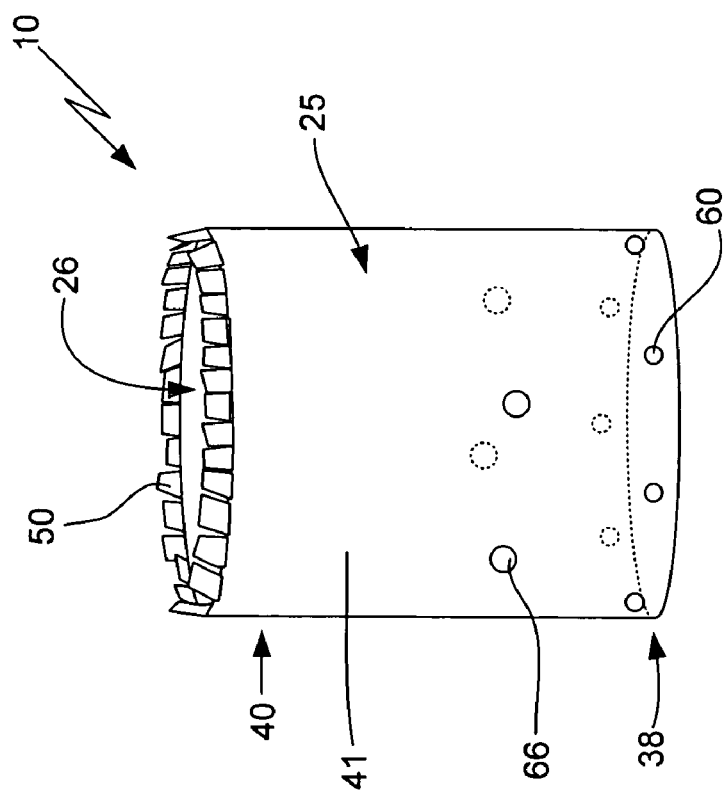
FIG. 8 is a side perspective view of an alternative preferred embodiment of the windscreen of the present invention having lateral support apertures for use with a one or more lateral support members.

In the embodiment shown in FIGS. 8 and 9, windscreen 10 is shown with the fixed open lower venting apertures 60 placed generally toward lower end 38 and a plurality of vent support tabs 50 at upper end 40. This embodiment also includes one or more (two are shown) lateral support apertures 66 in main body 24 of upright structure 25 that are each sized and configured to receive a lateral support member 68 therein. Each lateral support member 68 is configured to extend across interior area 26 and support the bottom 22 of cooking pot 14 above stove 12 (not shown) placed in interior area 26 at the lower end 38 of upright structure 25. In one configuration, lateral support members 68 are lightweight, small diameter rod or rod-like members that can be relatively easily placed through lateral support apertures 66 from one side of upright structure to the other (i.e., through a pair of opposing lateral support apertures 66 on side wall 41). In an alternative configuration, a lateral support member 68 can be inserted into interior area 26 through one lateral support aperture 66 to engage the inside of side wall 41 on the opposite side. Other configurations are also possible. The use of lateral support apertures 66 and members 68 for is particularly useful for smaller sized or narrow pots 14 (i.e., such as those made from an aluminum soda or beer can) that are utilized by backpackers or hikers who strive to reduce the weight of their equipment as much as possible. In the configuration shown, support tabs 50 do not support pot 14, but instead are used exclusively to selectively control the opening between the side wall 44 of pot 14 and side wall 41 of upright structure 25 so as to allow the user to control how much of the heat from stove 12 is allowed to pass through the upper end 40 and, thereby, heat the side wall 44 of pot 14. As stated above, this allows the user to more effectively control the heating of the material inside pot 14 and more efficiently utilize fuel by directing the heat from stove 12 to the side wall 44 of pot 14 instead of just the bottom 22 thereof, as with prior art windscreens.

Figure 11:
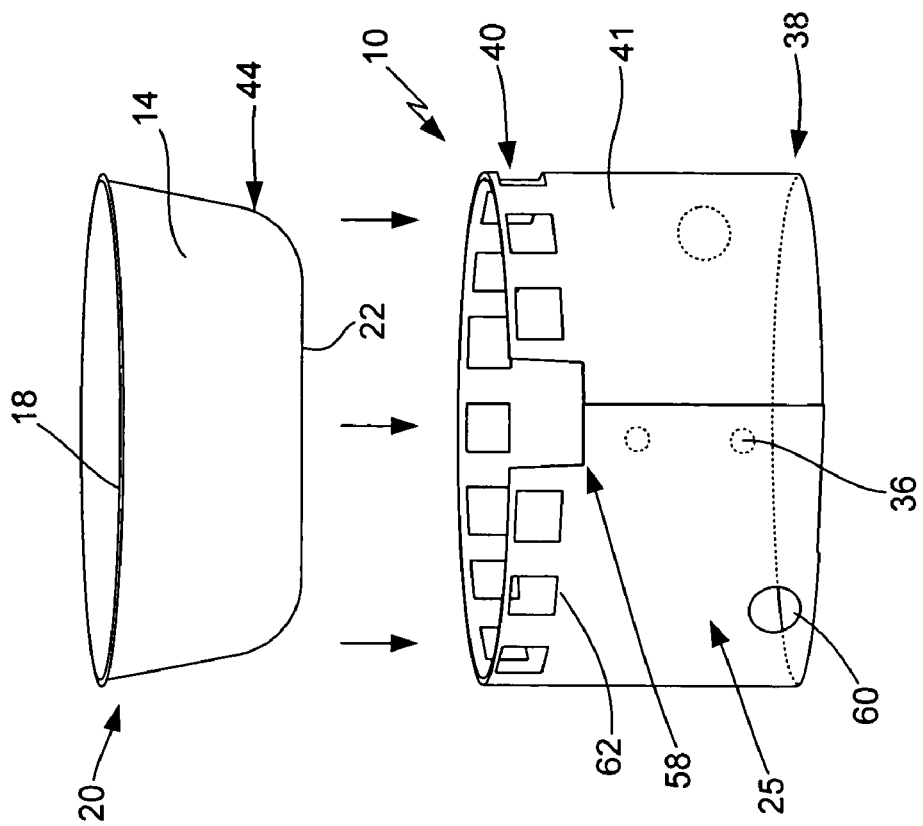
FIG. 11 is a side perspective view of the windscreen of FIG. 10 shown with a bowl to be supportedly received by the windscreen.
Figure 10:
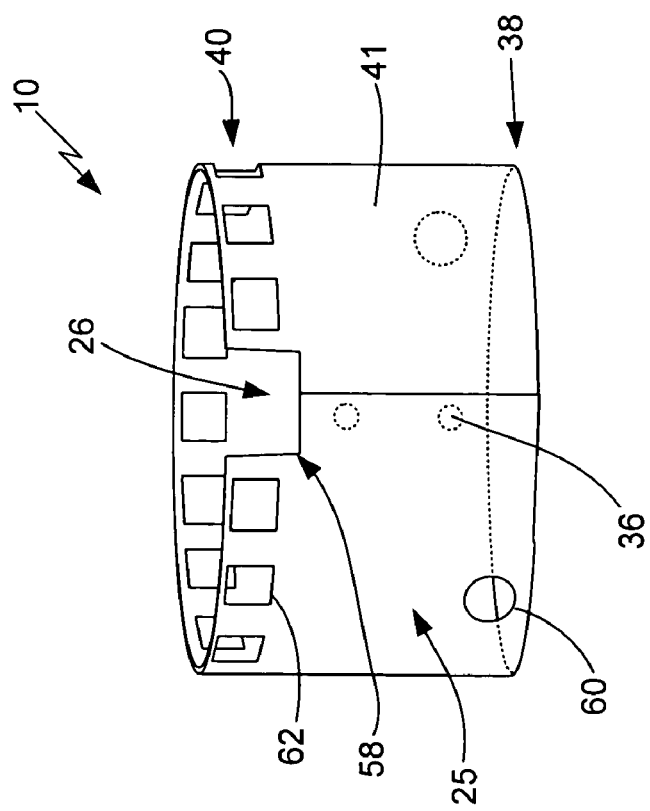
FIG. 10 is a side perspective view of an alternative preferred embodiment of the windscreen of the present invention specifically configured to support a bowl or like container.

In the embodiment shown in FIGS. 10 and 11, windscreen 10 has lower venting apertures 60 at lower end 38 and upper venting apertures 62 at upper end 40. In this configuration, lip 18 at upper edge 20 of pot 14 is supported by the upper end 40 of upright structure 25, formed from main body 24, much the same way as the embodiment shown in FIGS. 6 and 7. In this embodiment, however, there are fewer number of lower venting apertures 60 and upper venting apertures 62 and they are generally larger than the embodiment of FIGS. 5 through 7. In this embodiment, first 30 and second 32 ends of main body 24 are joined together to form a generally cylindrically-shaped windscreen 10. In the embodiment shown, at least second magnets 36 are utilized as connecting mechanism 28. To facilitate directing the heat from stove 12 to the side wall 44 of pot 14, instead of just the bottom 22 thereof, pot 14 is selected so as to have a substantially non-vertical side wall 44, such that it angles inward toward interior area 26 and away from side wall 41 of upright structure 25. The angled side wall 44 of pot 14, when used in conjunction with the substantially vertical side wall 41 of windscreen 10, serves much the same function as the cone-shaped windscreen 10 (i.e., FIGS. 5 through 7) to direct the heat toward side wall 44. As set forth above, in a typical backpacking stove 12 and pot 14 configuration, with or without a prior art windscreen, the heat from stove 12 hits the bottom 22 of pot 14, goes around the bottom edge thereof and is then discharged to the atmosphere, generally not heating side wall 44 of pot 14. With the substantially sealed upper end 40 of windscreen 10, from the connection of upper end 40 to lip 18 of pot 14, the heat from stove 12 will be directed along side wall 44 of pot prior to being discharged out upper venting apertures 62. This will more effectively heat the food and/or liquid materials inside pot 14 and more efficiently utilize the fuel for stove 12, thereby reducing the weight of fuel that is necessary for the user to carry when he or she is hiking or backpacking. If desired, either or both the lower 60 and upper 62 apertures can be configured with vent tabs 46 to allow the user to selectively control the air flow through interior area 26.

In the embodiment shown in FIGS. 12 and 13, windscreen 10 is configured to be generally conically shaped to receive a cooking container having substantially vertical side wall 44, such as a cup 70 having handles 72 and cup lip 74, so as to direct the heat from stove 12 to side wall 76 to heat the materials therein. In this configuration, access opening 58 is cut further down the side wall 41 from upper end 40 of main body 24 to provide sufficient space for handles 72 to extend therefrom so as to allow the user to grasp handles 72 and place cup 70 on or remove cup 70 from windscreen 10. The upper end 40 of windscreen 10 is configured to engage cup lip 74 so as to support cup 70 above stove 12 and substantially prevent the heat from stove 12 from escaping out the top of windscreen 10. Instead, the heat from stove 12 will exit interior area 26 through upper venting apertures 62 after being directed to the side wall 76 of cup 70 to more effectively and efficiently heat the materials therein. In this embodiment, which may be preferred under certain circumstances, connecting mechanism 28 comprises a first ridge section 78, a second ridge section 80, one or more insert tabs 82 and corresponding one or more openings 84. First ridge section 78 is configured to slide over second ridge section 80 such that it forms a substantially singular ridge area on side wall 41 of windscreen 10. As first ridge section 78 is placed over second ridge section 80, insert tabs 82 are directed into their matching opening 84 to secure first ridge section 78 over second ridge section 80 so as to join first end 30 and second end 32 of main body 24 into the desired support structure 25 (i.e., conical shape) for windscreen 10. As shown, vent tabs 46 are utilized at lower venting apertures 60 to selectively control the air flow therethrough. If desired, thought not shown, vent tabs 46 can be utilized with upper venting apertures 62. As with the above configurations, windscreen 10 of this configuration will better direct the heat from stove 12 to the side wall 76 of cup 70 and reduce the need to carry additional fuel.

Figure 14:
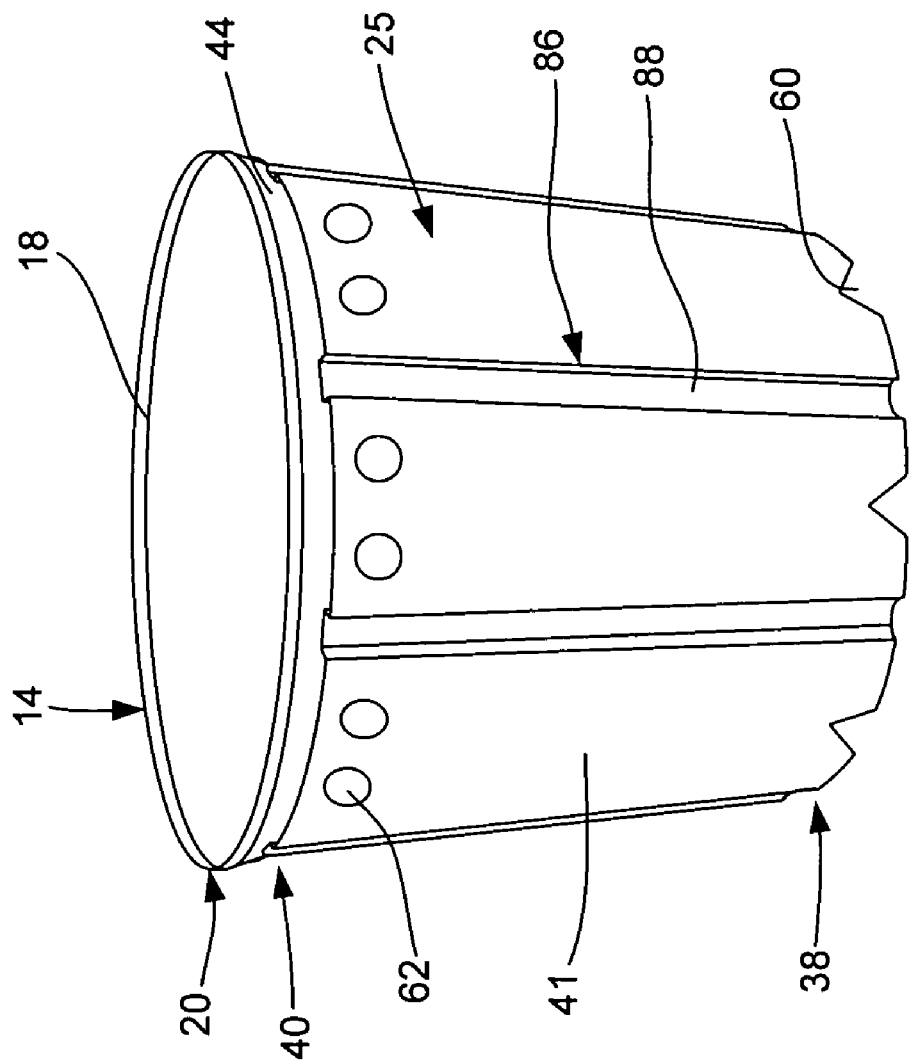
FIG. 14 is a side perspective view of an alternative preferred embodiment showing a windscreen having a plurality of vertical support ribs and in use with a pot or like container.

The embodiment of FIG. 14 illustrates the use of a plurality of ribs 86 on side wall 41 of upright structure 25. The present inventors have found that the use of support tabs 50 can be bent or otherwise damaged and, at times, difficult to adjust to fit the pot 14 in the preferred manner. Use of ribs 86 avoids such problems by providing an offset section 88 that is directed into interior area 26 of windscreen 10 when assembled in its use condition. In a preferred configuration, the ribs 86 are spaced apart around the circumference of the upper end 40 of upright structure 25, as shown in FIG. 14, and positioned between one or more lower venting apertures 60 and one or more upper venting apertures 62. The offset section 88 contacts the pot 14 at or near its upper edge, typically below lip 18, to support pot 14 in its upright position. The portion of side wall 41 that is between a pair of ribs 86 is effectively configured as a channel for the heat from stove 12 to flow upward along the side wall 44 of pot 14 to direct heat onto side wall 44. In addition, ribs 86 make windscreen 10 much sturdier. The depth of offset section 88 of ribs 86 can be configured for different sizes or configurations of pots 14. Smaller offset sections 88 will be generally sufficient for bowl-like containers that have a flow path around the pot 14. Larger offset sections 88 will be more beneficial for straight sided containers that need the greater area for exhaust flow around and along pot 14.

One issue with windscreen 10 of the present invention is the height of upright structure 25 relative to the height of the cooking containers, such as pot 14 and cup 70. Because it is preferred that windscreen 10 enclose the stove 12 and all or at least a majority of the sides of pot 14 or cup 70, the height of upright structure 25 will be greater than the height of the pot 14 or cup 70. In addition, because it is preferred that the material for main body 24 be selected so as to be sufficiently rigid and strong to support cooking containers pot 14 or cup 70 above and in spaced apart relation to stove 12 when the container is full of food and/or liquid, it will generally not be easy or recommended to fold or otherwise bend main body 24 in order to place windscreen 10 completely, or even substantially, inside the pot 14 or cup 70. As a result, when windscreen 10 is placed inside the pot 14 or cup 70 for storage and/or transport, which is the preferred and likely means of storing and carrying windscreen 10, the upper end 40 of upright structure 25 will extend above the upper edge 20 of pot 14 or cup 70, which presents potential problems with its packability, particularly for those who strive to carry as little weight as possible. To address this issue, windscreen 10 can be made into two or more separate body sections, such as those shown as 24a and 24b in FIGS. 15 and 17, that are joined together to form the upright structure 25 shown in FIGS. 16, 18 and 19.

In the embodiment of FIGS. 15 and 16, the windscreen 10 is formed from an upper body section 24a, having a first side 21a, second side 23a, first end 30a and second end 32a, and a lower body section 24b, having a first side 21b, second side 23b, first end 30b and second end 32b, that are configured to form a pair of stackable cones that are nested together to form the upright structure 25 having an interior area 26 for use as described above. In the embodiment shown, the first 30 and second 32 ends of both the upper 24a and lower 24b body sections are provided with first ridge section 78, a second ridge section 80, one or more insert tabs 82 and corresponding one or more openings 84 for closure mechanism 28, as described above for FIGS. 12 and 13. As shown in FIG. 15, the upper body section 24a is formed into the cone shaped structure such that the first (lower) side 21a thereof is placed over the second (upper) side 23b of lower body section 24b. In this embodiment, upper body section 24a is provided with a plurality of upper venting apertures 62 near upper end 40 and lower body section 24b is provided with a plurality of lower venting apertures 60 near lower end 38. This embodiment also includes an access opening 58 for a handle 72. Once stacked, the windscreen 10 performs as described above for the embodiments having a single piece upright structure 25. For storage and/or transport, windscreen 10 is disassembled into its separate upper 24a and lower 24b body sections that are then folded or rolled and then placed inside cooking container 14 or 70. As will be readily apparent to those skilled in the art, windscreen 10 of this embodiment can be provided with the various features and modifications discussed above, including but not limited to different closure mechanism 28, venting mechanisms 42 and the lateral support apertures 66 and members 68.

In the embodiment of FIGS. 17 and 18, the upper 24a and lower 24b body sections are formed with a straight cut that provides a spiral or spiral-like junction (as shown in FIG. 18). In this embodiment, the first side 21a of upper body section 24a rests on top of the second side 23b of lower body section 24b. Although windscreen 10 may be configured such that upper body section 24a stays in place on top of lower body section 24b, in the preferred embodiment a holding mechanism 90, such as the pieces of high temperature flue tape shown in FIG. 18, is utilized to maintain the upper 24a and lower 24b body sections together to form upright structure 25 and interior area 26. Various other types of holding mechanisms 90 can also be utilized, such as mechanical connectors (on the outside or inside of upright structure) that join the two body sections 24a and 24b together. Any such holding mechanism 90 must be configured to securely and safely support the cooking container at the upper end 40 thereof, preferably in spaced apart relation above the stove. The embodiment shown in FIGS. 17 and 18 also includes an access opening 58 for a handle 72 and the closure mechanism 28 having first folded lip 52 and second folded lip 54. As with other embodiments, windscreen 10 of this embodiment can have the various features and modifications discussed above, including but not limited to different closure mechanism 28, venting mechanisms 42 and the lateral support apertures 66 and members 68.

Figure 19:
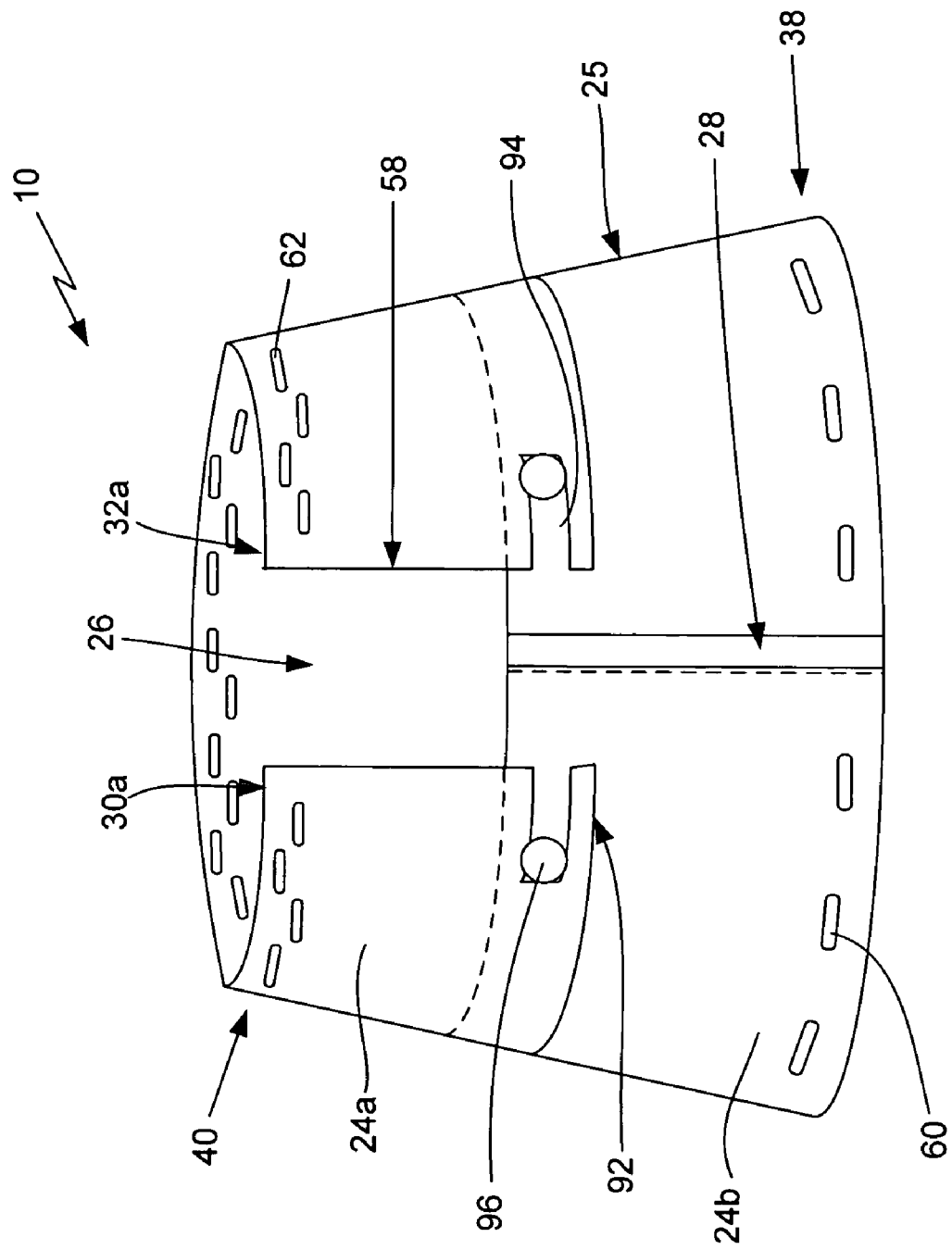
FIG. 19 is a side perspective view of an alternative embodiment of the windscreen of the present invention having a connecting mechanism to join the two body sections together in the assembled condition shown.

In the embodiment of FIG. 19, the bottom of upper body section 24a is received over the top of lower body section 24b in a manner similar to the embodiment described above with regard to FIGS. 15 and 16. However, the embodiment of FIG. 19 is provided with a specially configured access opening 58. Cups 70, or other containers, that have a handle 72 much closer to the upper end or lip 74 of the cup 70 can utilize a windscreen 10 having an access opening 58 similar to that shown in FIG. 18, which extends only part of the way down the side of upper body section 24a. However, some cooking containers, particularly the cup or cup-type shown as 70 in FIG. 13, have handles 72 which extend somewhat down most or the entire side of cup 70. For these containers, it is necessary to provide a windscreen 10 with a sufficiently large sized access opening 58 to allow handles 72 to extend outwardly from upright structure 25. When nested together, however, the second side 23b of lower body section 24b will generally block or otherwise prevent use of such a container. To solve this problem and provide the desired packability of a split or divided windscreen 10, the embodiment of FIG. 19 utilizes an upper body section 24a that has first end 30a that does not join with second end 32a, thereby providing a gap that defines access opening 58. To support upper body section 24a above lower body section 24b, the windscreen 10 is preferably provided with an attachment mechanism 92 that attaches upper body section 24a to lower body section 24b. In one embodiment, attachment mechanism 92 comprises a key slot 94 on upper body member 24a that is configured to receive a cooperatively configured protruding member 96 on lower body member 24b. In general, the use of key slot attachment mechanisms 92 are well known. As with the other components of windscreen 10, attachment mechanism 92 must be configured to support cooking container pot 14 or cup 70 above and in spaced apart relation to stove 12 when pot 14 or cup 70 is full of food and/or liquid. The embodiment shown in FIG. 19 illustrates one possible type of attachment mechanism 92. Those skilled in the art will readily understand that various configurations and types of attachment mechanisms can be incorporated into windscreen 10 of the present invention in a manner that provides the benefits described above.

With all of the foregoing configurations of windscreen 10, main body 24 can be shaped and configured to provide an upright structure 25 with a geometry that is adaptable with a variety of available stoves 12 and pots 14. In the embodiments where the lip 18 of pot 14 engages the upper end 40 of windscreen 10, pot 14 is supported off the ground or other support surface, preferably in spaced apart relation to the stove 12, to better heat pot 14 (as described above). Preferably, the height of upright structure 25 is such that the side wall 41 thereof extends along the majority of side wall 44 of pot 14, toward upper edge 20, to better direct the heat from stove 12 to side wall 44 and protect stove 12 from the blowing wind. In alternative embodiments, the connecting mechanism 28 can be like those described in the embodiments above or a variety of other different types of mechanisms suitable for joining first end 30 to second end 32 of main body 24. As stated above, preferably windscreen 10 and the various components thereof are made out of lightweight materials that are sufficiently stiff to form windscreen 10 so as to support the cooking container (i.e., pot 14 or cup 70) and any food and/or liquid therein above stove 12 and corrosion resistant for use in the outdoors, such as aluminum or stainless steel. In addition, for use with individually openable vent tabs 46 and foldable support tabs 50, the material for main body 24 should be sufficiently bendable to allow the user to repeatedly bend vents 46 and fold support tabs 50. In the above configurations, the top of interior area 26 is substantially closed by the engagement of upper end 40 of windscreen 10 with lip 18, upper edge 20 or side wall 44 of pot 14 so as to direct the heat from stove 12 to the side wall 44 of pot 14 before it is discharged to the atmosphere so as to more effectively and efficiently use the fuel for stove 12. In the foregoing embodiments, this is achieved by direct contact between the upper end 40 of windscreen 10 and lip 18 of pot 14 or side wall 76 of cup 70 (FIGS. 5-7, 10-11 and 12-13), between upper end 40 of windscreen 10 and side wall 44 of pot 14 (FIGS. 1-2 and 14), support tabs 50 and lip 18 of pot 14 (FIG. 3) and support tabs 50 and side wall 44 of pot 14 (FIGS. 8-9).

In use, the user will typically remove windscreen 10 from its storage container, such as bag or the like, and unroll main body 24 to the generally elongated disassembled condition shown in FIG. 1 and then connect first end 30 and second end 32 together to define the shape of upright structure 25, typically cylindrical or conical, and interior area 26. In some configurations, such as those with riveted or welded ends 30 and 32, windscreen 10 will either only need to be unfolded or will already be in the desired shape. For the embodiments of FIGS. 15 through 19, the user will need to assemble the upper body section 24a and the lower body section 24b and place them together to form upright structure 25. The user then places stove 12 on the ground or other appropriate surface, lights stove 12 and places windscreen 10 over stove 12 such that stove 12 is substantially at the center of the plane defined by lower end 38. If windscreen 10 is provided with adjustable vent tabs 46, the user adjusts the vent tabs to be open, closed or somewhere between so as to obtain the appropriate amount of air inside interior area 26 for stove 12. For instance, the user may want to close the up-wind vent tabs 46, open the down-wind vent tabs 26 and partially open the side facing vent tabs 46. If windscreen 10 has support tabs 50, then the user should adjust them to best receive the cooking container, such as cooking pot 14 or cup 70. The user then places the container (i.e., pot 14 or cup 70) into windscreen 10 at the upper end 40 thereof such that cooking pot 14 or cup 70, or any other appropriate container, is supported by upper end 40 or support tabs 50 in a manner that blocks off the free flow of heat from stove 12 past the top of interior area 26. In the preferred configuration, upper end 40 will support pot 14 or cup 70 above the stove 12 and in spaced apart relation thereto, even when pot 14 or cup 70 is full of food and/or liquid. The heat from stove 12 will be directed to the side wall 44 of pot 14, or side wall 76 of cup 70, to more effectively and efficiently heat the food and/or liquid therein, which will reduce the amount of fuel used for such cooking activities and, consequently, reduce the amount of fuel and, therefore, weight that must be carried on a given trip.

While there are shown and described herein a specific form of the invention, it will be readily apparent to those skilled in the art that the invention is not so limited, but is susceptible to various modifications and rearrangements in design and materials without departing from the spirit and scope of the invention. In particular, it should be noted that the present invention is subject to modification with regard to any dimensional relationships set forth herein and modifications in assembly, materials, size, shape, and use. For instance, there are numerous components described herein that can be replaced with equivalent functioning components to accomplish the objectives of the present invention.

What is claimed is:

1. A windscreen, stove, and cooking vessel combination, for heating materials in said cooking container, said combination comprising:

a cooking container comprising a cylindrical shaped sidewall, a bottom attached to a lower end of said sidewall, and a lip circumvolving an upper edge of said sidewall of said cooking container;

a fuel burning stove configured for placement inside a windscreen and under said cooking container;

a generally planar windscreen main body having a first end, a second end, a first side and a second side, said main body configured to define a generally conically shaped upright structure with an upper edge and a lower edge when said first end of said main body is joined to said second end, with said lower edge configured for placement on a ground surface, and with the upper edge a flat non rolled edge configured for insertion into a rolled rim of a container;

a releasable connector on said main body for connecting said first end and said second end to define said upright structure, said upright structure having an interior area, a lower end defined by said first side, an upper end defined by said second side and a side wall disposed therebetween, said stove received in said interior area, with said upper edge of said upright structure configured to engage and suspend said cooking container solely at said lip of said container above said stove with said side wall of said cooking container substantially inside said interior area of said upright structure, with said side wall of said upright structure configured to direct heat from said stove against said side wall of said cooking container with said windscreen configured to support said cylindrical wall cooking vessel with substantially all of the weight of the cooking vessel and substance being cooked below the upper edge of the windscreen, and with said upper edge defining an access opening configured to allow side attached handles of a cylindrical cooking vessel to extend through said windscreen while said cooking vessel is suspended from said upper edge;

a plurality of lower venting apertures disposed in said side wall of said upright structure generally at said lower end thereof for venting air into said interior area; and a plurality of upper venting apertures disposed in said side wall of said upright structure generally at said upper end thereof for venting air from said interior.

2. The windscreen according to claim 1, wherein said main body comprises at least an upper body section and a lower body section, each of said upper body section and said lower body section cooperatively configured so as to be assembled together so as to define said upright structure and be separated from each other for storage.

3. A windscreen stove, and cooking container combination, said combination comprising:

a cooking container comprising a vertical sidewall with one or more handles attached to said sidewall, a bottom attached to a lower end of said sidewall, and a lip circumvolving an upper edge of said sidewall of said cooking container;

a flame producing stove configured for placement on a ground surface inside said windscreen and under said bottom of said cooking container to provide direct contact of a flame from the stove and the bottom and substantially the entire sidewalls of said cooking container;

said windscreen comprising a main body having a first end, a second end, a first side and a second side, with said main body being generally planar and configured for rolling and unrolling with said windscreen configured to support said vertical wall cooking vessel over the stove with substantially all of the volume of the cooking vessel below the upper edge of the windscreen so that when a substance to be heated is added to the container, the center of gravity will be below the upper edge of the windscreen, and with said upper edge of the windscreen defining an access opening configured to allow side attached handles of a cylindrical cooking vessel to extend through said windscreen while said cooking vessel is suspended from said upper edge;

a releasable connector on said main body for connecting said first end and said second end so as to define an upright conical structure having an interior area, said upright structure having a lower end defined by said first side, an upper end defined by said second side and a side wall disposed therebetween, with said upright structure configured to surround said stove in said interior area, said upper end of said upright structure forming an upper edge with a diameter smaller than a diameter of said lower edge formed from said first side, with said upper edge configured to engage said lip of said cooking container so as to support said cooking container from said lip, with said cooking container suspended and supported only from said cooking container lip and with said side wall of said vertical sidewall cooking container substantially inside said interior area of said upright structure, and with said lower edge of said windscreen configured for placement on a ground surface;

a plurality of lower venting apertures in said side wall of said upright structure generally at said lower end thereof, said lower venting apertures configured to vent air into said interior area;

a plurality of upper venting apertures in said side wall of said upright structure generally at said upper end thereof and below said upper edge, to vent air from said interior area;

wherein said upright structure is configured to direct heat generated by said heat source to rise toward said bottom and sidewalls of said cooking container, with said stove supplied with air from said lower venting apertures and with air from said interior space vented out said upper venting apertures.

4. The windscreen according to claim 1, wherein said connecting means comprises one or more magnets at said first end and/or said second end of said main body.

5. The windscreen according to claim 1, wherein said connecting means comprises said first end and said second end cooperatively configured to engage each other.

6. The windscreen according to claim 1, wherein said connecting means comprises an outwardly extending first ridge section and at said first end and an outwardly extending second ridge section, said first ridge section configured to cooperatively engage said second ridge section.

7. The windscreen according to claim 1 further comprising an adjustable vent for selectively controlling air flow through one or more of said plurality of lower venting apertures.

8. The windscreen according to claim 7, wherein said adjustable vent further comprises a plurality of vent tabs bendably attached to said side wall of said upright structure, one of said plurality of vent tabs associated with one of said plurality of lower venting apertures and configured to selectively open or close said lower venting aperture so as to control air flow into said interior area of said upright structure.

9. The windscreen according to claim 1, wherein said main body comprises at least an upper body section and a lower body section, each of said upper body section and said lower body section cooperatively configured so as to be assembled together so as to define said upright structure and be separated from each other for storage.

10. The windscreen according to claim 1, wherein said upper edge further comprises a plurality of support tabs at said upper end of said upright structure, one or more of said plurality of support tabs bendably attached to said upper edge and configured to bend inward toward said interior area so as to direct heat from said stove toward said side wall of said cooking container and to bend generally upward so as to allow selective control of air flow from said interior area.

11. The windscreen according to claim 10, wherein said support tabs engage an outwardly extending lip of said cooking container to support said cooking container above said stove.

12. The windscreen according to claim 10, wherein said support tabs engage said side wall of said cooking container.

13. The windscreen according to claim 1 in which said upper edge further comprises an access opening, said access opening configured to allow insertion of said cooking container into said interior area and removal therefrom.

14. The windscreen according to claim 1, wherein said main body comprises at least an upper body section and a lower body section, each of said upper body section and said lower body section cooperatively configured to be assembled together so as to define said upright structure and be separated from each other for storage.

15. The windscreen according to claim 14, wherein at least one of said upper body section and said lower body section comprises means for attaching said upper body section and said lower body section together.

* * * * *